3,690,929
STABILIZATION OF PHOSPHOR SLURRIES
Yoshiyuki Yokota, 1506 Shinshiku; and Takashi Miyagawa, 1268 Karaoka, both of Hiratsuka-shi, Kanagawa-ken, Japan; Yasuto Tanaka, 2–38 Misono, Ota-ku, Tokyo, Japan; and Tatuki Torii, 668 Kamonomiya, Odawara-shi, Kanagawa-ken, Japan
Continuation-in-part of application Ser. No. 573,635, Aug. 19, 1966. This application Jan. 15, 1970, Ser. No. 3,144
Int. Cl. B44d 1/02, 5/00
U.S. Cl. 117—100 B                                     2 Claims

ABSTRACT OF THE DISCLOSURE

The photosensitive properties and stability of phosphor slurries used in photoprinting are improved by making a slightly soluble acidic oxide co-exist with a phosphor adapted for being applied to the inner surface of a cathode ray tube substantially in close contact with the surface of the phosphor particles, said acidic oxide being oxides of at least one element selected from the group consisting of boron, vanadium, gallium, germanium, arsenic, niobium, molybdenum, antimony, tantalum and tungsten.

---

Figure 1:
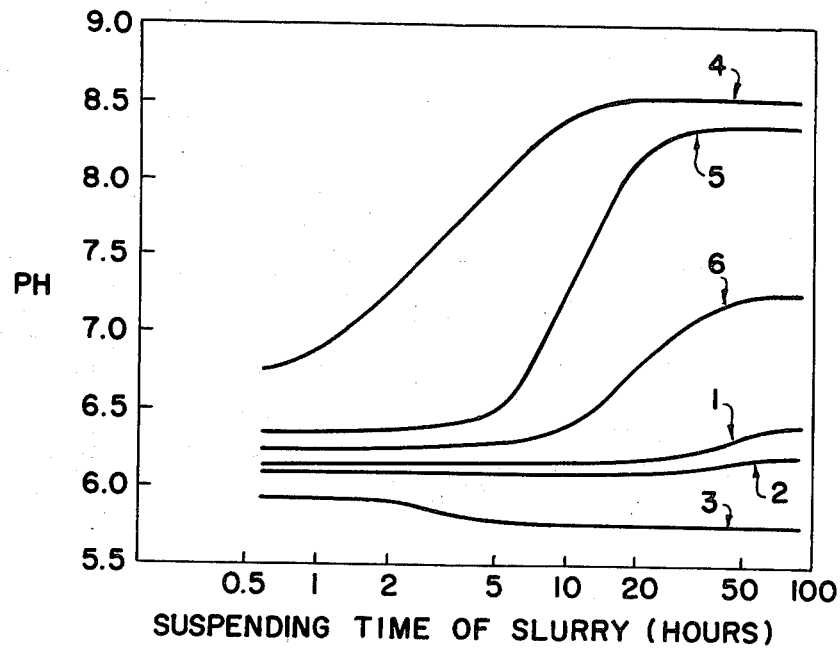

This application is a continuation-in-part of U.S. application Ser. No. 573,635, filed on Aug. 19, 1966, and now issued as U.S. Pat. 3,522,071.

This invention relates to improvements in the photosensitive properties of phosphor suspensions (hereinafter referred to as phosphor slurries) in which the phosphor is dispersed in a polyvinyl alcohol solution rendered photosensitive by a photosensitizer, e.g. ammonium bichromate, for use in photoprinting, and in phosphor screens using the phosphor slurries.

Phosphors, which are known to be used in the formation of phosphor screens for photoprinting include, for example, the phosphors for use in the phosphor screen of a color television picture tube such as blue emitting silver-activated zinc sulfide phosphor (ZnS:Ag), green emitting silver-activated zinc-cadmium sulfide phosphor $$((Zn,Cd)S:Ag)$$

and red emitting silver-activated zinc-cadmium sulfide phosphor ((Zn,Cd)S:Ag), europium-activated yttrium vanadate phosphor ($YVO_4$:Eu), europium-activated yttrium oxide phosphor ($Y_2O_3$:Eu), and europium-activated gadolinium oxide phosphor ($Gd_2O_3$:Eu).

These phosphors are applied as phosphor slurries in the formation of phosphor screens. When used as phosphor slurries with or without surface treatment with phosphate or silicate, the phosphors invite chemical reaction or physical or chemical absorption with the ammonium bichromate component in the phosphor slurry, and some phosphors cause considerable changes in the viscosity of the slurry with time. For this reason, it has been difficult to form uniform and homogeneous phosphor screens from the conventional slurries because of the changes in the slurry viscosity and, in addition, repeated use of such phosphor slurries has not been possible. If phosphor screens are made, the photosensitivity for fixing the screens is decreased because of the aforesaid effects of the phosphors upon the bichromate ions serving as the photosensitive agent in the phosphor slurries.

To make up for the decrease of the photosensitivity, it has been proposed to add ammonium bichromate in an amount more than essentially required to the phosphor slurry. However, bichromate ions added in such a large amount have an adverse effect on the emission brightness of the phosphors, and consequently, phosphor screens made from the conventional phosphor slurries have low emission brightness.

Especially when phosphor screens are to be formed of rare earth oxide phosphors such as $Y_2O_3$:Eu phosphor, $Gd_2O_3$:Eu phosphor, etc., the phosphors exhibit poor stability in the phosphor slurries. In short, the phosphor slurries using the above-mentioned phosphors are characterized by considerable change of viscosity, photosensitivity, and other properties with time due to the deterioration of the surfaces of the phosphor particles.

It is an object of the present invention to improve the stability of the phosphor slurries by the action of a certain reagent which is added either while the phosphors are being subjected to a certain surface treatment or during the preparation of the slurries.

Another object of the invention is to improve the photosensitivity of phosphor screens by increasing the sensitivity of the phosphor slurries.

A further object of the invention is to provide phosphors capable of forming phosphor screens which attain greater emission brightness under excitation by an electron beam than that of screens using conventional phosphors.

Surface treatments or coating processes which have heretofore been employed for phosphors include coating with silicate or phosphate for improving the dispersion of phosphors in solution, adhesion on a glass face, and protection of the phosphors against impurities. However, phosphor slurries formed from phosphors treated as above have shown no changes in the undesirable properties from the untreated ones.

The surface treatment according to the present invention comprises forming or depositing a slightly soluble acidic oxide on the phosphor surface. When phosphor slurries are prepared from the phosphors treated as above, the slurries are well protected against viscosity changes and can be used several times repeatedly over an extended period of time. Moreover, the phosphor screens formed from the surface-treated phosphors can have increased photosensitivity for fixing and, if the exposure conditions are kept unchanged, the phosphor slurries can contain smaller amounts of ammonium bichromate than those in the slurries of phosphors prepared by a conventional process. Thus, the amount of residual chromium in the perfected phosphor screens are smaller and the reduction of brightness of phosphors due to the presence of chromium is less than those in the conventional screens, and therefore brighter screens are obtained in accordance with the invention. When the same amount of ammonium bichromate is added as in an ordinary slurry is added, the phosphor slurry prepared by the use of a phosphor treated according to the invention permits a substantial shortening of the exposure time and hence of the operating time.

Figure 2:
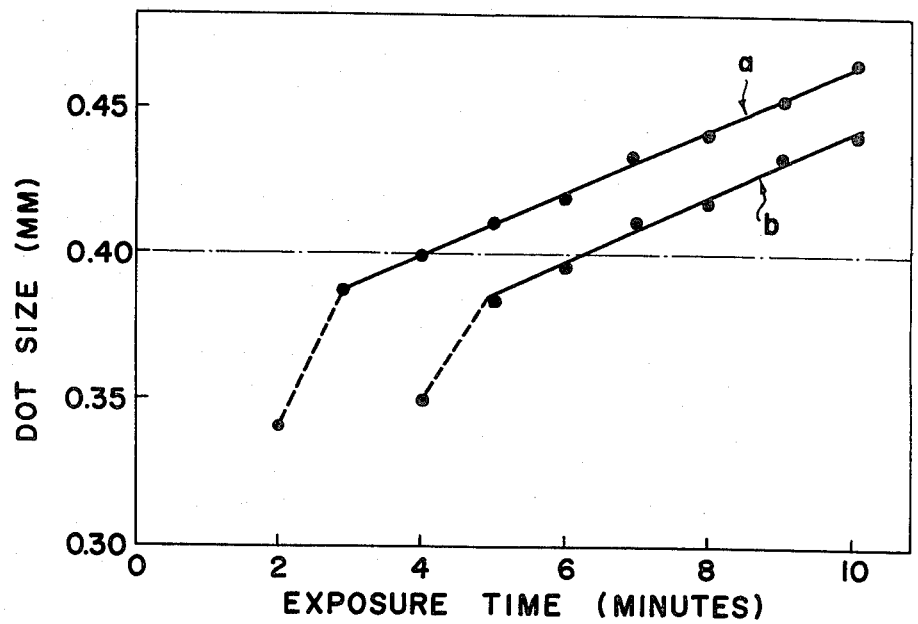

These and other advantages and features of this invention will be better understood as the description proceeds with reference to the accompanying drawings, in which:

FIG. 1 is a diagram showing the pH as a function of time of phosphor slurries prepared from an europium-activated yttrium oxide phosphor surface-treated with germanium oxide ($GeO_2$) and from the same phosphor but which was not surface-treated; and FIG. 2 is a diagram showing the relationship between the time of exposure to ultraviolet light irradiated to cause adhesion to the face plate of a cathode ray tube, of phosphor screens formed from silver-activated zinc-cadmium sulfide phosphor surface-treated with 2% by weight of germanium oxide ($GeO_2$) (curve $a$) and of the same phosphor not surface-treated (curve $b$), and the dot size of the phosphors obtained after development.

In general, there are two methods of forming or depositing a slightly soluble acidic oxide on the phosphor surface.

One method consists of mixing by a dry process or without any dispersant, a phosphor with a slightly soluble acidic oxide or a compound which can be converted on baking into said slightly soluble acidic oxide, and then baking the mixture, whereby the phosphor crystals and the additive react with each other on baking to form on the phosphor surface a slightly soluble acidic oxide and a compound in which the same element as the cationic component of the phosphor matrix crystals is incorporated as the cationic component. (For brevity the method is hereinafter referred to as "dry coating.")

The other method comprises either mixing by a wet process, e.g. in a paste state or in a suspension state, a phosphor with a slightly soluble acidic oxide or a compound which is readily converted in heating into said acidic oxide or depositing the said oxide or compound on the phosphor surface by wet process. (The method is hereinafter referred to as "wet surface-processing.")

The former is effective for oxyacidate-type or oxide-type phosphors such as $YVO_4$:Eu, $Y_2O_3$:Eu, etc. which are relatively resistant to impurities. The latter is particularly useful for sulfide-type phosphors such as ZnS:Ag, (Zn,Cd)S:Ag, etc. which sensitively respond to impurities and are most adversely affected by baking together with impurities other than the phosphor constituents. Of course the latter method is effective, though to a somewhat lesser extent, for the oxyacidate-type and oxide-type phophors as above mentioned.

For dry coating, the slightly soluble acidic oxides which are suitably used are: Oxides of one or more elements selected from the group consisting of B, Al, Ti, V, Ga, Ge, As, Nb, Mo, Sn, Sb, Ta and W; compounds such as the hydroxides or the ammonium salts of the above elements which can be readily heat decomposed to the oxides as mentioned above; or compounds having a cationic component which is the same element as the cationic component of the phosphor matrix crystals and also having an anionic component which is the oxide or oxides of one or more elements selected from the above group. (For brevity these compounds are hereinafter referred to as acidic oxides.) An important point which must be noted in choosing the acidic oxides is that favorable results are obtained by choosing such acidic oxides whose reaction with phosphors is initiated at relatively low temperatures. The slightly soluble acidic oxides or the compound produced by the reaction must not absorb light over the range from the ultraviolet to the infrared zones, particularly from near ultraviolet to visible zones and must not give any adverse effects upon the intrinsic emission properties, e.g. brightness, emission color and persistance, of the phosphor during the coating process. Furthermore, the acidic oxides must not provide any hindrance to the operation for applying a phosphor slurry onto a face-plate of a cathode ray tube and must have a relatively low solubility in water or phosphor slurries. Phosphor slurries prepared from phosphors treated with the acidic oxides which satisfy all of the above conditions are neutral or slightly acidic. The acidic oxides give particularly good results when they are of such types which can partially occur in colloidal form in phosphor slurries.

The slightly soluble acidic oxides for use in wet processing desirably have substantially the same properties as those possessed by the slightly soluble acidic oxides which are formed or deposited on the phosphor surface by the dry coating.

Essential points of the dry coating procedure are given below. It is important that one or more types of the acidic oxides or compounds which are readily converted on baking into the acidic oxides are added in an amount of 0.05 to 20% by weight, preferably 0.5 to 5% by weight, of the amount of a phosphor, and that the mixture be baked at a temperature which is lower than the temperature required to produce a thorough solid solution of the constituents but higher than the temperature at which the reaction with the phosphor is initiated. Baking treatment under such conditions is believed to cause a reaction between the superficial solid phases of the acidic oxides and phosphor to thereby produce a thin layer of the acidic oxides on the phosphor surface. The reason why importance is attached to the setting of the baking conditions within the range specified above is explained by the fact that, whereas the activation energy with which the acidic oxides are spread over the phosphor surface in the interphase reaction between the acidic oxides and the phosphor may be relatively small, a large activation energy is required in order that the oxides may be diffused into the phosphor to produce a crystallographical solid solution. It is therefore essential to choose such baking temperature and time that the acidic oxides will not be diffused into the phosphor but may remain spread or lightly deposited on the phosphor surface.

In the case that intrinsic properties of phosphors should be kept at a maximum, the phosphors may be wet-processed in order thereby to give a similar effect to the resulting phosphor slurries as by dry coating. Moreover, phosphors not adapted for dry coating, e.g. sulfide phosphors must be wet-processed. Wet surface-treating is accomplished by adding to a phosphor a slightly soluble acidic oxide in an amount of 0.05 to 20% weight, preferably 0.5 to 5% by weight, of the total weight of the phosphor and which is suspended in pure water or a suitable dispersant, thoroughly mixing them all together, and then drying. It is also possible to add a solution of a salt composed of the cationic element of the said oxide in a suspension of the phosphor and adjust the pH of the suspension toward the neutral or alkaline side, or to hydrolyze or otherwise treat the oxide so that it can deposit in the form of a hydroxide on the surface of the phosphor particles, and then dry them to permit the coating to regain the original form of an oxide. Phosphor slurries using the phosphors treated in the foregoing way have essentially the same properties as those of the phosphor slurries prepared from the dry coated phosphors. Alternatively, the slightly soluble acidic oxide may be added at the time of preparation of a phosphor slurry with a water-soluble polyvinyl alcohol, whereby the acidic oxide is adsorbed on the phosphor surface in the same way as in wet surface-treating so as to give the effects according to the objects of the invention.

It was discovered that, in case of the wet-process, stabilization of the phosphor slurry and increase of light sensibility, i.e. the objects of the present invention, do not necessarily require uniform deposition of the slightly soluble acidic oxide in the form of a continuous film on the surface of the phosphor particles, but these objects can be achieved if a suitable amount of said oxide coexists on the surface. That is to say, provided that a suitable amount of said slightly soluble acidic oxide ultimately coexists with the phosphor material in said slurry, the aimed desired effects can be obtained regardless of whether said slightly soluble acidic oxide is adhered to the surface of the phosphor particles or not. It is a matter of course, however, that the nearer the slightly soluble acidic oxide is present to the surface, the smaller is the amount of the oxide required to achieve the effect, and the firmer the oxide adheres to the surface, the more constantly and uniformly the effect maintained during the operation of preparing the phosphor screen for cathode ray tube. Accordingly, deposition of said oxide on the surface of the phosphor particles is more desirable in view of the resulting effects and also of technical convenience. And in case where the particles of said acidic oxide are much smaller in size than the particles of said phosphor material, even if these are directly or mechanically mixed, when the mixture is put in an aqeuous dispersant, the acidic oxide is physicochemically adsorbed onto the surface of the phosphor particles. Therefore, the most suitable amount of the oxide should naturally vary dependent on the type of phosphor and also on the manner of incorporating the same.

Based on test results, the function of the slightly soluble acidic oxide in the slurry is as follows:

In said slurry, a very small portion of said slightly soluble acidic oxide is dissolved. For example, in the case of $GeO_2$ for $Y_2O_3$:Eu phosphor material, $GeO_2$ is dissolved therein in a very small portion in the form of germanic acid. This dissolved acid presents very weak acidity and has a function to notably lower the speed of chemical reaction between the phosphor material and ammonium bichromate or of the reaction to convert $Y_2O_3$ into $Y(OH)_3$. In the case of $As_2O_3$, a very small portion thereof is dissolved in the slurry in the form of arsenic acid, and this substance remarkably lowers the speed of the degradation of bichromate ion. These results are the same in other slightly soluble acidic oxides. In such manner, the inoperability of the slurry can be controlled to a practically allowable degree.

It is therefore possible to say that the essential point in the wet-proces lies rather in the addition of the oxides of ptrticular types of elements than in the method of surface-coating itself.

Thus, the present invention relates to a method wherein a slightly soluble acidic oxide is blended with the phosphor material and preferably to effect coexistence thereof as near as possible with each other.

The present invention is further described with reference to the following examples which are given for illustration purposes only and not meant to limit the invention.

EXAMPLE 1

To 100 g. of europium-activated yttrium oxide phosphor ($Y_2O_3$:Eu) were added 1.5 g. of germanium oxide ($GeO_2$) and 100 cc. of pure water. After stirring and mixing thoroughly the above, the mixture was dehydrated and dried at 150° C. for 12 hours. The thus treated sample was $Y_2O_3$:Eu, europium-activated yttrium oxide phosphor, accompanied with 1.5% $GeO_2$ by physicochemical adsorption on its particle surface. Moreover, by the same method as mentioned above, $Y_2O_3$:Eu, europium-activated yttrium oxide phosphors, treated with 3%, 2%, 1.2% and 1%, respectively, were prepared. Polyvinyl alcohol-ammonium bichromate system slurries of the same composition were prepared by use of the above-mentioned five kinds of treated europium-activated yttrium oxide. Each slurry was prepared by mixing 20 g. of the above-mentioned europium-activated yttrium oxide phosphor, 80 cc. of a 5.4% polyvinyl alcohol aqueous solution and 2.8 cc. of a 10% ammonium bichromate aqueous solution with stirring. Each pH value after a different period of time at which the slurry was allowed to stand after preparation of the slurry was measured. FIG. 1 shows the relation between the lapse of time after preparation of the slurry and the pH of the slurry. Curve 1 is the result in respect to the slurry of $Y_2O_3$:Eu, europium-activated yttrium oxide phosphor, coated with 1.5% $GeO_2$. In about 50 hours after preparation of the slurry, the pH value increased a little, but the pH value was hardly changed from the beginning value of 6.3. Moreover, even after 100 hours after preparation of the slurry, a dotted phosphor screen could be formed by the slurry without any obstruction.

The curve 2 in FIG. 1 relates to the slurry of $Y_2O_3$:Eu, europium-activated yttrium oxide phosphor, treated with 2% $GeO_2$. Even 100 hours after the preparation of the slurry the pH value was hardly changed. The phosphor dot screen could be formed by the slurry without any obstruction. However, the photosensitivity became slightly higher than in case of treating with 1.5% $GeO_2$, and therefore a dot having a slightly larger diameter was formed.

The curve 3 in FIG. 1 relates to the slurry of europium-activated yttrium oxide phosphors treated with 3% $GeO_2$. With lapse of time the pH value decreased a little. When the slurry was used for the production of a phosphor dot screen, the photosensitivity became too high and therefore a dot having an abnormally large diameter was formed.

Curve 4 in FIG. 1 is the result in respect to the slurry of $Y_2O_3$:Eu, europium-activated yttrium oxide phosphor, which was not treated with $GeO_2$.

Curve 5 and curve 6 relate to slurries of $Y_2O_3$:Eu, europium-activated yttrium oxide phosphor, treated with 1% and 1.2% $GeO_2$, respectively.

As seen in curves 4, 5 and 6, when the amount of the added $GeO_2$ was less than about 1.2%, the pH value of the slurry became more than 7 about 10 hours after the slurry was prepared. Because of the increase of the pH value, the ammonium bichromate in the slurry was converted into ammonium chromate having no photosensitivity, and simultaneously polyvinyl alcohol was gelantinized. Therefore, it was quite impossible to form a phosphor dot screen by use of these slurries.

Judging from the above-mentioned results, it has been found that $Y_2O_3$:Eu, europium-activated yttrium oxide phosphor, has such a property as losing the photosensitivity of the slurry by changing the bichromate ion in the slurry to the chromate ion because of the strong basic activity of $Y_2O_3$, the host material of said $Y_2O_3$:Eu phosphor. By treating with $GeO_2$, the reaction between the phosphor and ammonium bichromate was reduced.

Conversion of ammonium bichromate was not effected by treating with about 1.5–2% $GeO_2$. When the amount of the $GeO_2$ was increased, photosensitivity became too high, and therefore it was rather difficult to use the slurry.

EXAMPLE 2

To 100 g. of europium-activated gadolinium oxide phosphor ($Gd_2O_3$:Eu), were added 5.5 g. of germanium oxide ($GeO_2$) and 100 cc. of pure water. After mixing the resulting materials, the mixture was dehydrated and dried at 150° C. for 24 hours. 25 g. of europium-activated gadolinium oxide phosphor ($Gd_2O_3$:Eu) thus treated with 5.5% of $GeO_2$, 80 cc. of a 5.4% polyvinyl alcohol aqueous sotion and 2.8 cc. of a 10% ammonium bichromate aqueous solution were stirred and mixed to prepare a slurry. The pH value of the slurry was measured with respect to elapsed time after the slurry was prepared, whereby almost similar results to those in curve 1 of FIG. 1 were attained. The results of measuring the pH value of the slurry of $Gd_2O_3$:Eu phosphor treated with 4% $GeO_2$ according to the same method were almost similar to curve 6 in FIG. 1. When a $Gd_2O_3$:Eu phosphor slurry treated with 5.5% $GeO_2$ was used, a good phosphor dot screen could be formed.

EXAMPLE 3

Two grams of germanium oxide ($GeO_2$) was added to 100 g. of green emitting silver-activated zinc-cadmium sulfide phosphor ((Zn,Cd)S:Ag). Further with the addition of a suitable amount of pure water, the whole mixture in a suitable form of paste was thoroughly mixed and dried at 150° C. for 12 hours. The face of a 19-inch color television picture tube using the screen of a phosphor slurry prepared from the phosphor as above treated was subjected to stepped exposures. The size of the resulting phosphor dots was determined in relation to the exposure time. The results are represented by the curve a in FIG. 2. A phosphor slurry prepared from a phosphor of the same type but not treated as above was similarly tested. The results were as given by the curve b in FIG. 2. From the figure it will be seen that the exposure time to obtain the optimum dot size of 0.4 mm. for 19-inch color television picture tubes is shortened, e.g. about two thirds of the time usually required with untreated phosphors. It was confirmed that the optimum dot size can also be obtained by preparing the phosphor slurry from the treated phosphor together with ammonium bichromate which is beforehand decreased in amount to two thirds of the usual amount and subjecting the resulting screen to the same exposure time. It will be understood from this that the residual chromium amount in the finished phosphor screen can be decreased by the use of a phosphor treated in accordance with the present example, and therefore the phosphor screen thus obtained is subjected to less adverse effect of the residual chromium and can have a 5 to 10% increase in the brightness.

EXAMPLE 4

To 100 g. of europium-activated gadolinium oxide phosphor ($Gd_2O_3$:Eu), 2 g. of molybdenum oxide ($MoO_3$) and 80 ml. of pure water were added to form a homogeneous paste and then the paste was dried. The phosphor slurry prepared using the sample thus obtained was as effective as the slurry described in Example 2.

EXAMPLE 5

Four grams of germanium oxide ($GeO_2$) and 100 cc. of pure water were added to 100 g. of europium-activated gadolinium oxide phosphor ($Gd_2O_3$:Eu). After mixing the above-mentioned materials, the mixture was dehydrated and dried at 150° C. for 12 hours. The dried mixture was placed in a quartz pot and heated further at 900° C. for 30 minutes in air. After cooling the heated mixture, 25 g. of the resulting mixture, 80 cc. of a 5.4% polyvinyl alcohol aqueous solution and 2.8 cc. of a 10% ammonium bichromate aqueous solution were mixed and stirred to make a slurry. The pH value of the slurry was measured. Even in 120 hours after preparation of the slurry, the pH value did not change from the initial value of 6.2 in 120 hours after preparation of the slurry.

By heating the $Gd_2O_3$:Eu phosphor in this example there is attained such an effect as more strongly bonding $GeO_2$, which had been adsorbed physicochemically on the surface of the phosphor particle, with the surface of said phosphor particle by forming partially interfacial compounds between the $GeO_2$ and the phosphor particle. That is, compared with the case when 4 g. of $GeO_2$ was adsorbed on the surface of the phosphor particle of 100 g. of $Gd_2O_3$:Eu phosphor, as stated in Example 2, in which case the change in the pH value of the slurry occurred in 10 hours after preparation of the slurry, and in 20 hours conversion was effected so greatly as formation of the phosphor screen was substantially difficult.

The above-mentioned effect of heating appeared rapidly near 700° C., but above about 1000° C., the surface-adsorbed $GeO_2$ was diffused into the phosphor particle. As a result, the brightness of the phosphor was reduced simultaneously with disappearance of the effect of the surface-treating.

EXAMPLE 6

One gram of germanium oxide ($GeO_2$) and 100 cc. of pure water were added to 100 g. of europium-activated yttrium oxide phosphor ($Y_2O_3$:Eu). After mixing the above-mentioned material, the mixture was dehydrated and dried at 150° C. for 12 hours. The dried mixture was heated at 700° C. for 1 hour in air. After cooling the mixture, a slurry was prepared by use of said mixture. The pH value of the slurry was measured. Almost the same results as in Example 5 could be attained. When a phosphor screen was formed by use of the slurry, a good dot phosphor screen could be formed.

EXAMPLE 6A

Three grams of boric anhydride ($B_2O_3$) was added to 100 g. of europium-activated yttrium oxide phosphor ($Y_2O_3$:Eu) and was thoroughly mixed. The mixture was baked at 650° C. for one hour. The phosphor slurry prepared of the phosphor sample thus obtained exhibited the same effects as in Example 6.

EXAMPLE 7

To 20 g. of europium-activated yttrium oxide phosphor ($Y_2O_3$:Eu), 0.52 g. of germanium oxide ($GeO_2$) was directly added. With the thus obtained composition, 80 cc. of a 5.4% polyvinyl alcohol aqueous solution and 2.8 cc. of a 10% ammonium bichromate aqueous solution were mixed thoroughly to make a slurry. When the pH value was measured in the same manner as in Example 1, quite the same results as shown in curve 2 of FIG. 1 were attained. Moreover, 0.26 g., 0.30 g., 0.4 g. and 0.75 g. of $GeO_2$, respectively were added to 20 g. of the phosphor to make phosphors. These phosphors were used to prepare slurries having the same composition as the slurry stated above. The pH values of these slurries were measured as in Example 1. Almost the same results as shown in FIG. 1 were attained. That is, phosphors to which were added 0.26 g., 0.30 g., 0.4 g. and 0.75 g. of $GeO_2$, respectively, could attain almost similar results as shown respectively in curve 5, curve 6, curve 1 and curve 3 in FIG. 1.

As a result, it has been found that $GeO_2$ in a form previously adsorbed uniformly on the surface of the $Y_2O_3$:Eu phosphor particle was not required and analogous results could be attained when $Y_2O_3$:Eu phosphor previously adsorbed with $GeO_2$ was employed, because one part of $GeO_2$ was automatically physicochemically adsorbed to the surface of the phosphor particle in the slurry. As clear from the comparison of Example 1 with this example, when the $Y_2O_3$:Eu phosphor having a particle surface which previously was adsorbed uniformly with $GeO_2$ was employed, the amount of $GeO_2$ required was reduced by 20–40% and reproducibility of the effect attained by the surface-treating was greatly superior.

EXAMPLE 8

To 25 g. of europium-activated gadolinium oxide phosphor ($Gd_2O_3$:Eu), 1.7 g. of germanium oxide ($GeO_2$) was directly added. With the thus obtained composition, 80 cc. of a 5.4% polyvinyl alcohol aqueous solution and 2.8 cc. of a 10% ammonium bichromate aqueous solution were thoroughly mixed, to form a slurry. The pH value of the slurry was effected in the same manner as in Example 1. The results were the same as in Example 2 and curve 1 in FIG. 1. The present example was compared with Example 2. The amount of $GeO_2$ to be used became increased by about 25% in employing the method of this example.

EXAMPLE 9

Three grams of tantalum oxide ($Ta_2O_5$) were added to 100 g. of silver-activated zinc sulfide phosphor (ZnS:Ag) and mixed thoroughly. The phosphor slurry prepared from the composition thus obtained showed good stability and increased photosensitivity analogous to the slurry in Example 3.

EXAMPLE 10

Two grams of gallium oxide ($Ga_2O_3$) were added to 100 g. of red emitting silver-activated zinc-cadmium sulfide phosphor ((Zn,Cd)S:Ag) and mixed thoroughly. The phosphor slurry prepared from the composition thus obtained had substantially the same properties as those of the slurry according to Example 9.

EXAMPLE 11

To 100 g. of gadolinium oxide phosphor ($Gd_2O_3$:Eu) were added 8 g. of arsenic troxide ($As_2O_3$), 150 cc. of pure water and 200 cc. of a 9% aqueous solution of PVA. The mixture was milled and kneaded together by a ball mill for 0.5 to 1 hour. After removal of the balls, 12 cc. of a 10% aqueous solution of ammonium bichromate was added to the mixture thereby to prepare a phosphor slurry. Comparable to the phosphor slurry formed of the treated phosphor as described in Example 2, the slurry prepared as above was appreciably stable with no changes in the pH and viscosity for a prolonged period of time.

EXAMPLE 12

To 100 g. of europium-activated yttrium vanadate phosphor ($YVO_4$:Eu) were added 8 g. of germanium sulfide ($GeS_2$), 150 cc. of pure water, and 50 cc. of concentrated hydrochloric acid thereby to prepare a suspension. The suspension was heated to 50–80° C., cooled, and dried.

In the course of the procedure GeS$_2$ was decomposed into germanium oxide (GeO$_2$) and H$_2$S. GeO$_2$ was on the phosphor surface while H$_2$S was removed. The phosphor treated in this way was used in preparing a phosphor slurry. The phosphor slurry showed increased stability and photosensitivity similar to the slurry prepared from the treated phosphor as described in Example 3.

EXAMPLE 13

To 100 g. of europium-activated yttrium vanadate phosphor (YVO$_4$:Eu) were added 2.3 g. of antimony chloride (SbCl$_3$), 300 cc. of pure water, and 4 cc. of concentrated ammonia solution to prepare a suspension. The suspension was heated at 60° C. for three hours, cooled, filtered and dried. In the course of the procedure, hydrolysis of SbCl$_3$ took place and antimony oxide (Sb$_2$O$_3$) was deposited on the phosphor surface. The phosphor treated in this way was used in preparing a phosphor slurry. The phosphor slurry showed increased stability and photosensitivity similar to the slurry prepared from the treated phosphor as described in Example 12.

EXAMPLE 14

To 100 g. of europium-activated gadolinium vanadate phosphor (GdVO$_4$:Eu), 1.35 g. of ammonium molybdate ((NH$_4$)$_2$MoO$_4$) were added and mixed homogeneously. The mixture thus prepared was put in a quartz crucible and heated at 600° C. for 30 minutes in air. In the sample thus obtained, as a result of heat-decomposition of the added (NH$_4$)$_2$MoO$_4$, ammonia and moisture released to leave molybdenum oxide (MoO$_3$) on the surface of the phosphor particles. The slurry prepared using the sample thus obtained was as effective as the slurry described in Example 3.

What we claim is:

1. A method comprising stabilizing a slurry of a phosphor to be used in photoprinting by making a slightly soluble acidic oxide co-exist with the phosphor substantially in close contact with the surface of the phosphor particles without baking, said phosphor being a zinc sulfide phosphor, a zinc-cadmium sulfide phosphor, a rare earth oxide phosphor or a rare earth oxyacidate phosphor, said acidic oxides being oxides of at least one element selected from the group consisting of boron, vanadium, gallium, germanium, arsenic, niobium, molybdenum, antimony, tantalum and tungsten, and the amount of said acidic oxides being 0.05 to 20% by weight of the phosphor.

2. A method as defined in claim 1 wherein the slightly soluble acidic oxide is adsorbed on the surface of the phosphor particles by thoroughly mixing said acidic oxide with said phosphor by mixing in a paste state.

References Cited

UNITED STATES PATENTS

| | | | |
|---|---|---|---|
| 2,586,304 | 2/1952 | Coltman et al. | 117—33.5 X |
| 2,763,567 | 9/1956 | Nagy | 117—33.5 X |
| 2,867,587 | 1/1959 | Donahue et al. | 117—33.5 X |
| 2,878,137 | 3/1959 | Butler et al. | 117—33.5 X |
| 2,971,859 | 2/1961 | Sisneros et al. | 117—33.5 X |
| 3,095,317 | 6/1963 | Saffire | 117—33.5 |
| 3,264,133 | 8/1966 | Brooks | 117—100 X |
| 3,522,071 | 7/1970 | Yokota et al. | 117—100 X |
| 3,547,675 | 12/1970 | Hosokoshi | 117—100 X |

WILLIAM D. MARTIN, Primary Examiner

M. R. P. PERRONE, Jr., Assistant Examiner

U.S. Cl. X.R.

117—33.5 CS, 33.5 C, 33.5 R; 252—301.4 S, 301.5, 301.6 S